United States Patent
Wen

(10) Patent No.: US 10,778,744 B2
(45) Date of Patent: Sep. 15, 2020

(54) CONFIGURABLE CACHING SYSTEM AND METHOD THEREOF

(71) Applicant: MOLBASE (Shanghai) Biotechnology Co., Ltd., Shanghai (CN)

(72) Inventor: Jun Wen, Shanghai (CN)

(73) Assignee: MOLBASE (SHANGHAI) BIOTECHNOLOGY CO., LTD., Shanghai (CN)

(*) Notice: Subject to any disclaimer, the term of this patent is extended or adjusted under 35 U.S.C. 154(b) by 111 days.

(21) Appl. No.: 14/861,449

(22) Filed: Sep. 22, 2015

(65) Prior Publication Data

US 2017/0046303 A1 Feb. 16, 2017

Related U.S. Application Data

(60) Provisional application No. 62/204,881, filed on Aug. 13, 2015.

(51) Int. Cl.
*G06F 15/167* (2006.01)
*H04L 29/08* (2006.01)

(52) U.S. Cl.
CPC .......... *H04L 67/02* (2013.01); *H04L 67/2842* (2013.01)

(58) Field of Classification Search
CPC ...... H04L 67/02; H04L 67/2842; G06F 17/30
USPC ................................ 709/203, 213
See application file for complete search history.

(56) References Cited

U.S. PATENT DOCUMENTS

| | | | |
|---|---|---|---|
| 7,571,217 B1* | 8/2009 | Saxena | H04L 29/06 709/217 |
| 2006/0074894 A1* | 4/2006 | Remahl | G06F 16/9535 |
| 2007/0258108 A1* | 11/2007 | Matsumoto | G06Q 10/087 358/1.15 |
| 2009/0125579 A1* | 5/2009 | Saillet | H04L 67/34 709/203 |
| 2011/0137888 A1* | 6/2011 | Yoo | G06F 16/9574 707/713 |
| 2014/0016513 A1* | 1/2014 | Garcia Martin | H04L 51/38 370/259 |
| 2014/0344670 A1* | 11/2014 | Cathey | G06F 16/9535 715/234 |
| 2015/0379014 A1* | 12/2015 | Xu | G06F 17/211 707/711 |
| 2016/0226730 A1* | 8/2016 | Schumacher | G06Q 10/00 |

* cited by examiner

Primary Examiner — Duyen M Doan
(74) *Attorney, Agent, or Firm* — Muncy, Geissler, Olds & Lowe, P.C.

(57) ABSTRACT

A configurable caching system and a method thereof are disclosed. The system includes a front-end scheduler and a front-end caching server. The front-end scheduler is configured with relevant location rules and an embedded script language Lua. The system and method use rewriting and the custom header scope value in the front-end scheduler to eliminate factors that may interfere caching, thereby maximizing the hit ratio of cachi. This ensures different URLs are cached in a logically consistent manner, and ensures the same URL provides independent cache logic to every user who has logged in.

6 Claims, 1 Drawing Sheet

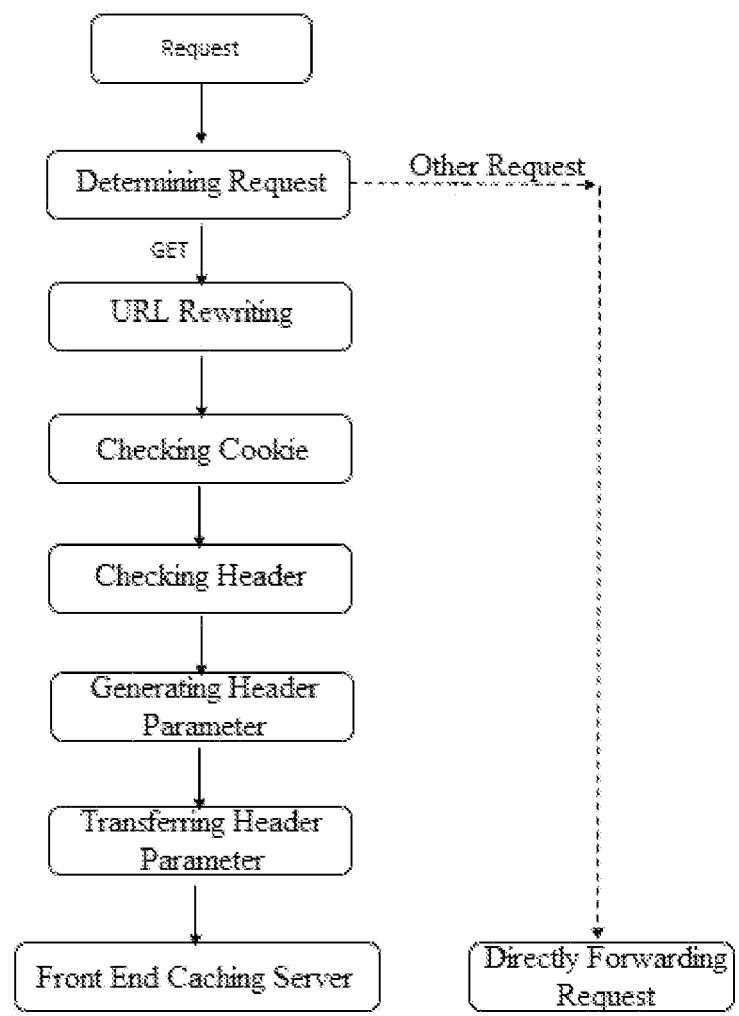

CONFIGURABLE CACHING SYSTEM AND METHOD THEREOF

BACKGROUND OF THE INVENTION

1. Technical Field

The present invention relates to the field of the internet, and more particularly to a front-end caching system and its method.

2. Description of Related Art

Caching technology is extensively used in computer systems, from computers to various routing devices, from software implementation to hardware implementation. A properly designed caching system can significantly reduce its response time, thereby ensuring good user experience. In internet-related applications, caching systems are divided into back-end caching systems such as memcache and redis, and front-end caching systems such as Squid, Varnish, Nginx and Apache Traffic Server. In either case, for meeting business needs, it is most important to have a high caching hit ratio.

As mentioned herein, front-end caching services refer to caching services that are as described in HTTP and achieved using CDN technology and employ Squid, Varnish, Nginx or Apache Traffic Server as front-end buffering mechanism.

HTTP is a protocol defines front-end caching services and supporting details for local caching of browsers. Whether caching is possible is dependent on URLs and many http header scope values. In practical business scenarios, may factors can make caching invalid, such as browsers, operating systems, URL redirection, parameter get, and cookies.

SUMMARY OF THE INVENTION

The present invention aims to address the shortcomings of the prior art by providing a configurable caching system and a method thereof.

The first objective of the present invention is to provide a configurable caching system that comprises a front-end scheduler and a front-end caching server. The front-end scheduler is configured with relevant location rules and an embedded script language Lua. The front-end scheduler determines an access request by checking whether a URL matches custom header parameters, and transfers the finally executed parameters to the front-end caching server.

The second objective of the present invention is to provide a configurable caching method, which is conducted using the configurable caching system as described above. The method comprises at least the following steps:

(1) the front-end scheduler forwarding a request and determining the request so as to ensure only a request GET matches;

(2) the front-end scheduler checking request parameters and rewriting a URL to eliminate parameters that are irrelevant to logic, so as to ensure that the parameters that are irrelevant to logic in the request hit an identical cache result;

(3) the front-end scheduler checking cookie contents of the request and extracting and executing cookie values relevant to logic;

(4) the front-end scheduler checking other header contents of the request and extracting and executing scope values relevant to logic, and transferring the scope values to a configured variable flang;

(5) the front-end scheduler determining whether the variable flang matches a default value, and if so, transferring the value to a preset variable deflang, so as to generate a correct header scope value; and (6) the front-end scheduler transferring the final header scope value to the front-end caching server.

In the configurable caching method, in Step (2), the request parameters are determined through location rules in a front-end agent layer, and if they can be cached, the URL is rewritten.

In the configurable caching system, the front-end scheduler is an Nginx proxy server.

To sum up, with the foregoing technical schemes, the present invention uses rewriting and the custom header scope value in the front-end scheduler to eliminate factors that may interfere caching, thereby maximizing the hit ratio of cachi. This ensures different URLs are cached in a logically consistent manner, and ensures the same URL provides independent cache logic to every user who has logged in.

BRIEF DESCRIPTION OF THE DRAWINGS

The sole FIGURE is a flowchart of a configurable caching system and its method according to the present invention.

DETAILED DESCRIPTION OF THE INVENTION

The following description, in conjunction with the accompanying drawings and preferred embodiments, is set forth as below to illustrate the implement, structure, features and effects of the subject matter of the present invention.

Embodiment 1

Referring to the sole FIGURE, according to the present invention, a configurable caching system comprises a front-end scheduler and a front-end caching server. The front-end scheduler, as mentioned herein, refers to Layer-7 application agent software extensively used in web-based development. For example, nginx and haproxy are both highly efficient front-end schedulers. In the present invention, nginx is preferred.

The front-end scheduler is configured with relevant location rules and an embedded script language Lua. The present invention has the aid of programming of an embedded script language Lua and uses rewriting and the custom header scope value in the front-end scheduler to eliminate factors that may interfere caching, thereby maximizing the hit ratio of cachi.

The configurable caching method of the present invention is conducted using the configurable caching system as described above. The method comprises at least the following steps.

In a first step (1), the front-end scheduler forwards the request and determines the request. Through the parameter request_method=GET parameter, it makes that itself only matches the request GET.

In a second step (2), the front scheduler checks the request parameters. The request parameters are determined by referring to the location rules in the front-end agent layer. If they can be cached, URL rewriting is performed. By performing URL rewriting, the parameters that are irrelevant to logic are eliminated, so as to ensure that the parameters in the request that are irrelevant to logic all hit the same cache result.

Taking "rewrite/demo.php?test=abc/demo.php last;" for example, parameter test=abc is irrelevant to execution logic, meaning that it has no effects on the final results. Through this rewriting, it is ensured that '/demo.php?test=abc' and "/demo.php" hit the same cache result.

In a third step (3), the front-end scheduler checks the cookie contents of the request, and extracts and executes the cookie values that are relevant to logic.

Taking checking the language version in user cookies for example, a default variable deflang is set, and if there are other values in the cookie, the content of the variable is changed to a corresponding value.

```
set $deflang en;
If( $cookie_deflang ) {
    set $deflang $cookie_deflang;
}.
```

In a fourth step (4), the front-end scheduler checks other header contents of the request, and extracts and executes scope values relevant to logic. Then the scope value is transferred to a configured variable flang.

An example here is checking the user browser's language environment:

```
set_by_lua $flang '
    local I = ngx.req.get_headers( )['Accept-Language ']
    return 1
'.
```

In a fifth step (5), the front-end scheduler determines whether the variable flang matches a preset value. If it does, the value is transferred to the default variable deflang, so as to generate a corrent header scope value. Then the default variable is transferred to the front-end caching server through Fastcig_param of the nginx.

An example here is checking the language version:

```
if( $flang ~ 'zh' ) {
    set $deflang zh;
}
```

Fastcgi_param HTTP_VARY_DEFLANG $deflang.

In a sixth step (6), the front-end scheduler transfers the final header scope value to the front-end caching server.

With the foregoing steps (1)~(6), it is ensured that different URLs are cached in a logically consistent manner, and that the same URL provides independent cache logic to every user who has logged in.

Embodiment 2

An example here is differentiating user language versions, and the present invention is divided into proxy service configuration logic and response matching logic.

The proxy service configuration logic is, for example:

```
rewrite /demo.php?test=abc /demo.php last;       #using internal redirection for modifying URL
set $deflang en;                                  #default
set_by_lua $flang '
    local 1 = ngx.req.get_headers( )['Accept-Language']
    return 1
';
if ( $flang ~ 'zh' ) {                            #browser logic --Request head Accept-Language
    set $deflang zh;
}
if ( $cookie_deflang ) {                          #cookie logic --deflang
    set $deflang $cookie_deflang;
}
fastcgi_param HTTP_VARY_DEFLANG $deflang;        #generating request head Vary-Deflang.
The response matching logic is:
header('Vary: Vary-Deflang').
```

The foregoing example merely shows matching and rewriting for a certain URL, and checking and differentiating for user language versions. Through simple expansion, this approach can be further applied to matching/rewriting for and URLs, and checking for other parameters.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A configurable caching system, comprising:
   a hardware processor that is configured to perform as a front-end scheduler and a front-end caching server, the front-end scheduler forwarding a request of a URL, determining whether a request GET matches in the request, checking request parameters of the request, rewriting the URL to eliminate parameters irrelevant to an execution rule, setting a default browser language configuration value, checking cookie contents of the request and extracting and executing cookie values relevant to the execution rule, determining if another configuration value is present in the cookie contents, and if so directly setting the another configuration value as the default browser language configuration value, checking header contents of the request, extracting and executing a browser language configuration value relevant to the execution rule, setting the browser language configuration value as a configured variable, determining whether the configured variable matches a predetermined value, if so, setting the predetermined value as the default browser language configuration value, generating a header scope value based on the default browser language configuration value, and forwarding the generated header scope value to the front-end caching server.

2. A configurable caching method comprising at least the following steps;
(1) by a front-end scheduler, forwarding a request of a URL and determining whether only a request GET matches in the request;
(2) by the front-end scheduler, checking request parameters of the request and rewriting the URL to eliminate parameters that are irrelevant to an execution rule, to allow parameters that are irrelevant to the execution rule in the request hit an identical cache result;
(3) by the front-end scheduler, setting a default browser language configuration value, checking cookie contents of the request, extracting and executing cookie values relevant to the execution rule, determining if another configuration value is present in the cookie contents, and if so directly setting the another configuration value as the default browser language configuration value;
(4) by the front-end scheduler, checking header contents of the request and extracting and executing a browser language configuration value relevant to the execution rule, and setting the browser language configuration value a configured variable;
(5) by the front-end scheduler, determining whether the configured variable matches a predetermined value, if so, setting the predetermined value as the default browser language configuration value, and generating a header scope value based on the default browser language configuration value; and
(6) by the front-end scheduler, forwarding the generated header scope value to a front-end caching server.

3. The configurable caching method of claim 2, wherein, in Step (2), if the request parameters are determined that they can be cached, the URL is rewritten.

4. The configurable caching system of claim 1, wherein the front-end scheduler is an Nginx proxy server.

5. The configurable caching method of claim 2, wherein the browser language configuration value is a browser language environment.

6. The configurable caching system of claim 1, wherein the browser language configuration value is a browser language environment.

* * * * *